United States Patent [19]

Sankey et al.

[11] 4,371,086
[45] Feb. 1, 1983

[54] SUPPORT STRUCTURES OF EXCAVATING MACHINES

[75] Inventors: Edwin W. Sankey, Marion, Ohio; David J. Whittingham, Dallas, Tex.

[73] Assignee: Dresser Industries, Inc., Dallas, Tex.

[21] Appl. No.: 163,635

[22] Filed: Jun. 27, 1980

[51] Int. Cl.³ .......................................... B66C 23/84
[52] U.S. Cl. .................................... 212/253; 384/110
[58] Field of Search .............. 212/253; 308/9, DIG. 1

[56] References Cited

U.S. PATENT DOCUMENTS

| 775,923 | 11/1904 | Holmes | 308/9 |
|---|---|---|---|
| 3,143,381 | 8/1964 | Vurpillot | 308/9 |
| 3,708,215 | 1/1973 | Wilcock et al. | 308/9 X |
| 3,759,588 | 9/1973 | Anderson | 308/9 X |
| 3,985,406 | 10/1976 | Baron | 212/253 X |
| 4,076,339 | 2/1978 | Schrolucke | 308/9 |

Primary Examiner—James L. Rowland
Attorney, Agent, or Firm—Gerald L. Lett

[57] ABSTRACT

In an excavating machine having a lower frame, an upper frame and means for rotatably supporting the upper frame on the lower frame, an assembly for improving the load conditions of the upper frame supporting structure comprising an annular seal mounted on one of the upper and lower frames and disposed in wiping, sealing engagement with the other of the upper and lower frames, forming a sealed chamber between the upper and lower frames, and air is supplied under pressure to the chamber to provide an upwardly directed force on the upper frame alleviating the load imposed on the upper frame supporting structure.

20 Claims, 5 Drawing Figures

SUPPORT STRUCTURES OF EXCAVATING MACHINES

This invention relates to large excavators used in the strip mining industry, such as draglines and stripping shovels, and more particularly to an improvement in the support of the upper, rotatable frames of such machines.

Large excavators of the dragline or stripping shovel type generally are provided with a lower frame or tub which is supported on the ground either adjacent to or in the pit of a surface mine, a live roller circle mounted on the lower frame or tub and an upper frame mounted on the live roller circle and rotatable relative to the lower frame or tub. The live roller circle of such types of machines typically consists of a lower rail mounted on the lower frame or tub, made up of a plurality of arcuate segments disposed in end-to-end relation, a set of rollers supported on the lower rail, a roller cage structure maintaining the rollers in circumferentially spaced relation, and an upper rail supported on the set of rollers and mounted on the upper frame, made up of a plurality of arcuate segments disposed in end-to-end relation.

Typically, large excavators of the dragline or stripping shovel type weigh in the range of 2500 to 3500 tons, and are provided with booms having lengths of up to 400 feet, and buckets or dippers having capacities of up to 200 cubic yards.

The eccentric load imposed by the boom or a combination of a boom and a dipper handle, and the limited arc of travel of the upper frames of such machines during normal operation, results in the application of nonuniform and highly concentrated loads on a small segment of the live roller circles of such machines. Unless certain measures are taken to alleviate such highly concentrated loads and the high stresses developed by such loads, the rails and/or rollers of such live roller circles may begin to spall and eventually fail. The failure of rails and rollers in live roller circles of large excavators is a costly matter. Where such failure occurs, the machine must be taken out of service, thus adversely affecting its productivity, and the rails and/or rollers must be replaced, which is costly in materials and labor.

In the prior art, several approaches have been taken to reduce rail and roller failure, and thus prolong the service life of roller circles. Rails and rollers have been redesigned. The metallurgy of rails and rollers has been improved upon. More recently, it has been proposed to install a cushioning material between the upper rail and the upper frame, and/or between the lower rail and the lower frame, principally for the purpose of more uniformly distributing the load imposed on the roller circle over a greater arc, to include a greater number of rail segments and rollers.

While the aforementioned approaches have been successful and useful to various degrees, it has been found to be desirable to provide alternate or complementary means for alleviating the adverse effects of the application of eccentric loads on the roller circles of large excavators to further prolong the service life of the rails and rollers of such roller circles.

Accordingly, it is the principal object of the present invention to provide an improved means of supporting the upper, rotatable frame of a large excavator such as a dragline or stripping shovel.

Another object of the present invention is to provide an improved means for alleviating the adverse effects of the nonuniform distribution of loads imposed on the live roller circles of live excavators such as dragline and stripping shovels.

A further object of the present invention is to provide a support structure for a large excavator provided with a live roller circle in which the service life of the rails and rollers is prolonged.

A still further object of the present invention is to provide an improved means for complementing the support function of a live roller circle in a large excavator such as a dragline or stripping shovel, in which the adverse effects of nonuniform distributions of loads on rail segments and rollers of the roller circles are obviated.

Another object of the present invention is to provide an improvement in the support structure of a large excavator, such as a dragline or stripping shovel which is simple in design, comparatively inexpensive to manufacture and install, and effective in alleviating the loads and particularly nonuniformly distributed loads on the live roller circles of such machines.

Other objects and advantages of the present invention will become more apparent to those persons having ordinary skill in the art to which this invention pertains from the following description taken in conjunction with the accompanying drawings wherein.

Figure 1:
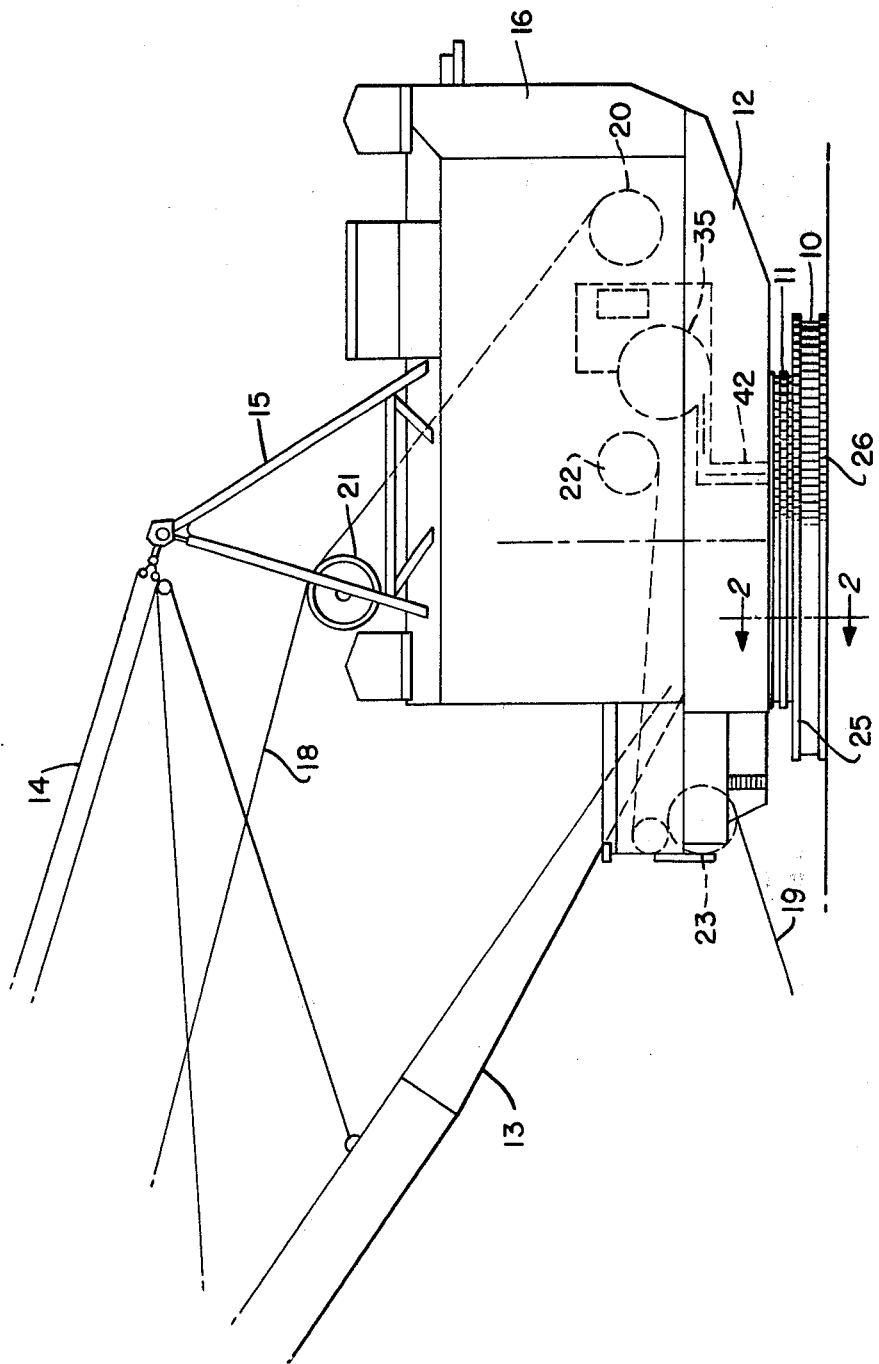
FIG. 1 is a side-elevational view of a large excavating machine embodying the present invention, having portions thereof broken away and other portions thereof represented diagrammatically.

Referring to FIG. 1 of the drawings, there is illustrated a dragline machine generally including a lower frame or tub 10, a live roller circle 11 mounted on the tub and an upper frame 12 rotatably mounted on the roller circle. Connected at the front end of the upper frame is a boom 13 which is supported at its outer end or point by pendants 14 secured to the upper end of a gantry 15. The gantry is mounted on the upper frame 12 and is partially enclosed by a housing 16. Also disposed within housing 16 and supported on upper frame 12 is hoist and drag machinery which operates hoist lines 18 and drag lines 19. Hoist lines 18 are wound on a hoist drum 20, extend upwardly, over a set of sheaves 21 mounted on the front legs of the gantry, extend forwardly, over and around a set of boom point sheaves and extend downwardly to where they are connected to a drag line bucket (not shown). Drag lines 19 are wound on a drag line drum 22, extend forwardly and over and around a set of fairlead sheaves 23 and extend forwardly where they are operatively connected to the front end of the drag line bucket.

Figure 2:
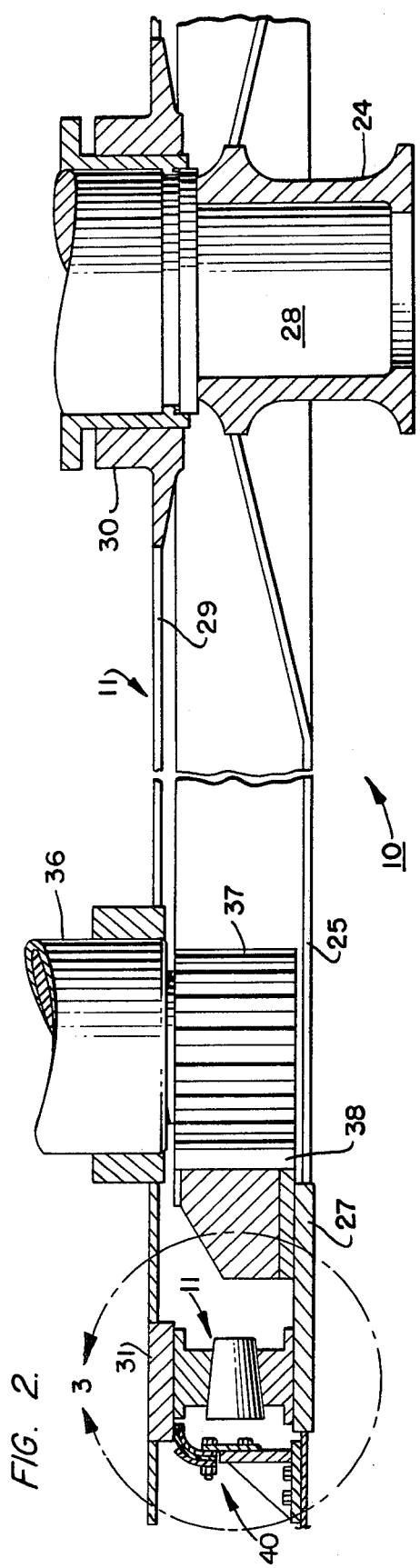
FIG. 2 is an enlarged cross-sectional view taken along line 2—2 in FIG. 1, having portions thereof broken away.

The lower frame or tub 10 includes a lower center journal housing 24, an upper plate 25, a lower plate 26 which is adapted to be seated on the ground, and a grid structure consisting of an arrangement of ribs and bulkheads interconnecting the lower center journal housing and the upper and lower plates to form an integral structure. As best illustrated in FIG. 2, upper plate 25 of the lower frame is formed with a plurality of arcuate pad segments to provide an annular lower rail pad 27 disposed adjacent the outer side of the lower frame and concentrically relative to center journal housing 24.

A center journal 28 is mounted at its lower end in housing 24 and is journaled at its upper end to upper frame 11. The upper frame consists of a lower plate 29 rigidly secured to an upper center journal housing 30, an upper plate and a grid structure consisting of a plurality of interconnected ribs and bulkheads forming an integral structure. As best shown in FIG. 2, lower plate 29 of the upper frame is formed with a plurality of arcuate pad segments providing an upper rail pad 31 disposed substantially in vertical alignment with lower rail pad 27.

Live roller circle 11 consists of a lower rail 32, a set of rollers 33, a cage structure for the rollers and an upper rail 34. Lower rail 32 consists of a plurality of arcuate rail segments mounted on and rigidly secured to lower rail pad 27. The upper ends of the lower rail segments are provided with inclined surfaces on which tapered rollers 33 are supported. Each of the rollers is provided with a shaft journaled at its ends in the cage structure. Upper rail 34 consists of a plurality of arcuate rail segments mounted and rigidly secured to upper rail pad 32. The upper rail segments are provided with lower inclined surfaces which are supported on tapered rollers 33.

In addition to the hoist and drag machinery, conventional swing and propel machinery are mounted on the upper frame for swinging the upper frame relative to the lower frame and for propelling the entire machine. The various motions of the machine are powered by electrical machinery mounted on the upper deck which are cooled by forced air provided by one or more compressors 35 also mounted on the upper frame within housing 16.

The swing machinery of the unit consists of a number of swing units mounted on the upper frame and drivingly connected to a ring gear mounted on the lower frame. Each of such units includes a motor and gear reduction unit mounted on the upper frame and a downwardly extending drive shaft 36 having a pinion 37 mounted on the lower end thereof and meshing with a ring or swing gear 38. Ring gear 38 is made up of a plurality of gear segments. The ring gear segments are seated on and rigidly secured to the inner end of lower rail pad 27.

Figure 3:
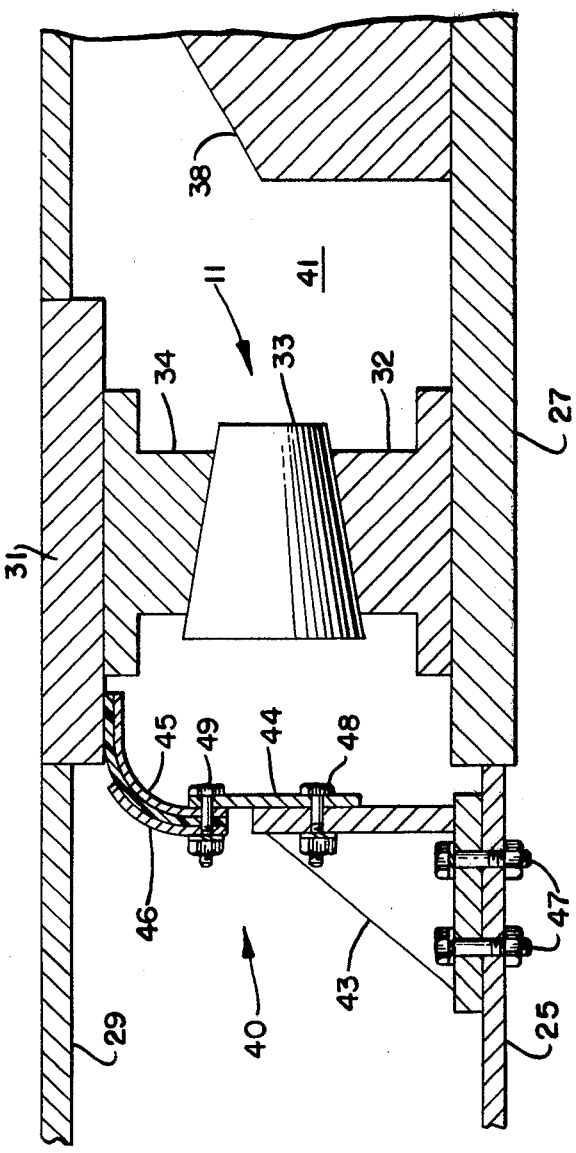
FIG. 3 is an enlarged view of the section designated by the reference numeral 3 in FIG. 2.

FIGS. 2 and 3 illustrate the most elementary form of the present invention. Such form consists of a sealing assembly 40 disposed between the upper and lower frames to provide a chamber 41 which is supplied with air under pressure from compressors 35 through a suitable duct arrangement 42. Referring to FIG. 3, it will seen that sealing assembly 40 consists of a bracket structure 43, a mounting structure 44, a seal 45 and a retainer assembly 46. Bracket structure 43 consists of a plurality of bracket segments disposed in end-to-end relation about the periphery of lower rail pad 27 and rigidly secured to upper plate 25 by sets of bolts and nuts 47. Mounting member 44 consists of a plurality of arcuate segments disposed in end-to-end relation and secured to the upper ends of the bracket segments by means of bolt and nut sets 48. Sealing member 45 may consist of any suitable, flexible, wear-resistant material such as leather, polyurethane or a rubber and Teflon laminate. The lower end of the sealing element is clamped between the upper end of mounting structure 44 and retainer assembly 46 by means of bolt and nut sets 49. The upper, free end of the sealing member engages a lower, outer surface of upper rail pad 31 and is disposed in wiping contact therewith. Air under pressure is supplied to chamber 41 by compressor 35 mounted on the main deck through duct work 42. Preferably, chamber 41 is pressurized in the range of 5 to 15 psi which has been calculated to reduce maximum roller load by up to about 33 percent.

Because of cost considerations, it is not intended that the seal provided between the upper and lower frames be highly effective. It is anticipated that there will be some loss of air through the seal. However, such outflow of air through the seal about the periphery of the live roller circle is considered to be beneficial in that it will have the effect of blowing dust and other debris away from the roller circle, thus contributing to keeping it clean and functioning more effectively. To further effect a better seal between the upper and lower frames, it is contemplated to provide a seal between such frames about the center journal. A sealing assembly comparable to sealing assembly 40 may be used for such purpose. Pressurization of chamber 40 further can be enhanced by plugging and sealing other openings in the upper plate of the lower frame and the lower plate of the upper frame through which air would normally leak.

Figure 4:
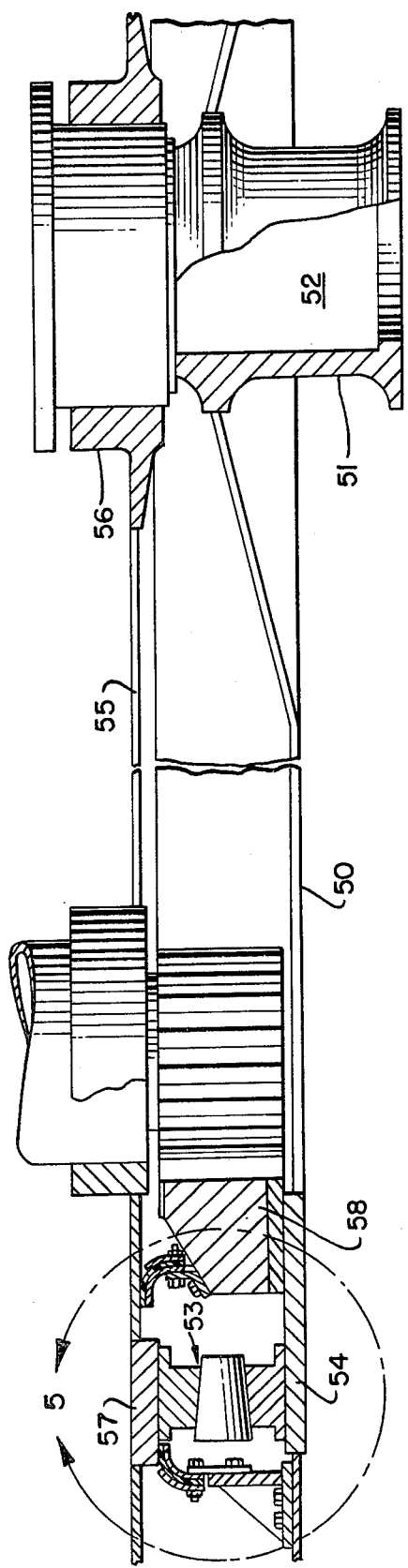
FIG. 4 is a cross-sectional view similar to the figure shown in FIG. 2, illustrating another embodiment of the present invention.
Figure 5:
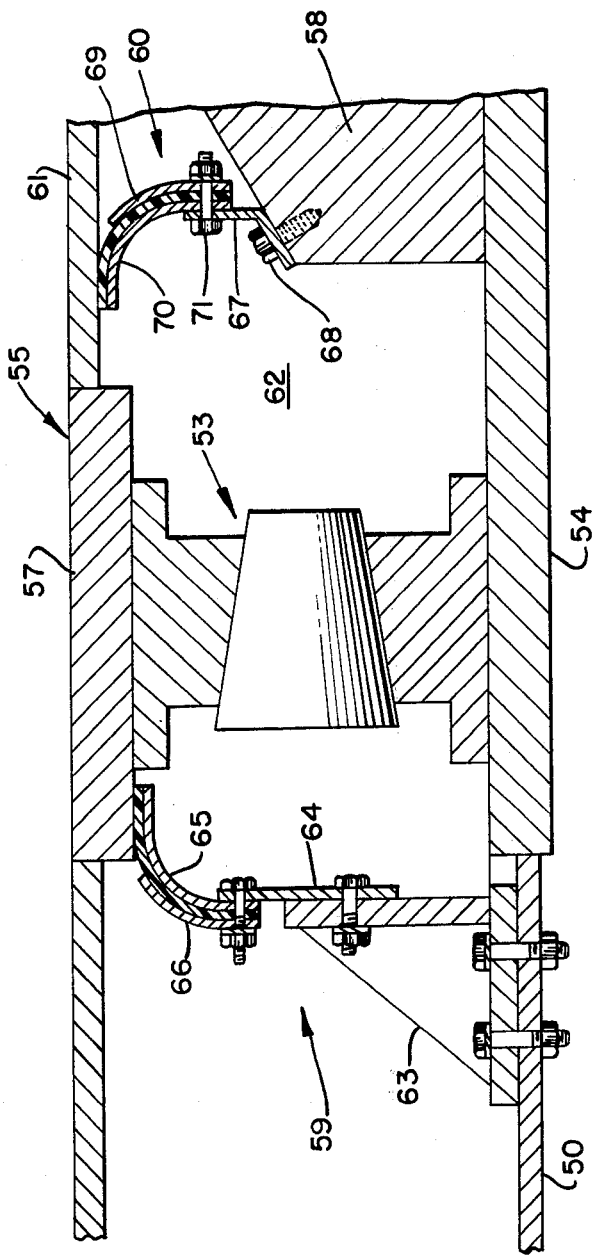
FIG. 5 is an enlarged view of the section designated by the reference numeral 5 in FIG. 4.

Another embodiment of the invention is illustrated in FIGS. 4 and 5. Referring to FIG. 4, there is shown a portion of a machine such as a dragline or stripping shovel including a lower frame 50 having a lower center journal housing 51, a center journal 52 mounted in the lower center journal housing, a live roller circle 53 mounted on a lower rail pad 54 of the lower frame, an upper frame 55 having an upper center journal housing 56 in which the upper end of the center journal is journaled and an upper rail pad 57 which is supported on roller circle 53. A ring gear 58 also is mounted on lower rail pad 54, which is engaged in driving relation with a number of pinions of a set of swing units. Essentially, the machine frame components, shown in FIGS. 4 and 5, are similar in construction and function to the machine frame components described in connection with the embodiment shown in FIGS. 2 and 3. The machine frame components, shown in FIGS. 4 and 5, are provided with an outer sealing assembly 59 mounted on the lower frame and engaging upper rail pad 57 and an inner sealing assembly 60 mounted on ring gear segments 58 and engaging a lower plate 61 of upper frame 55. Sealing assemblies 59 and 60 are annular and disposed concentrically relative to the center journal, providing an annular chamber 62 containing live roller circle 53.

Sealing assembly 59 consists of a bracket structure 63, a mounting structure 64, a seal 65 and a retainer assembly 66. Seal 65 is clamped at its lower end between retainer assembly 66 and mounting structure 64, and engages a lower, outer surface of upper rail pad 57 at its upper end. The seal consists of a Teflon and rubber laminate with the Teflon constitutent engaging the upper rail pad in wiping relation.

Sealing assembly 60 similarly consists of a mounting structure 67 rigidly mounted on ring gear segments 58 by means of bolts 68, a retainer assembly 69 and a seal 70 having the lower end thereof clamped between mounting structure 67 and retainer assembly 69 by means of a number of sets of bolts and nuts 71, and having the upper end engaging a lower surface of lower plate 61 of the upper frame, in wiping relation. Seal 70 consists of a rubber and Teflon laminate having the Teflon constituent thereof engaging lower plate 61.

Air under pressure is supplied to annular chamber 62 by means of one or more air compressors mounted on the upper frame of the machine through a suitable ducting system similar to the ducting system shown diagrammatically in FIG. 1. The pressure in annular chamber 62 preferably is maintained in the range of 5 to 15 psi.

In each of the embodiments as described, it further is contemplated that the retaining assemblies of the sealing assemblies may be adjustable vertically so as to permit adjustment of the sealing engagement for maximizing sealing action. It further is contemplated that the sealing elements may be notched along their upper free ends so as to avoid wrinkling which is a cause of leakage. Provision also can be made for drain holes for removing condensed water vapor from the pressurized chambers.

The present invention has several advantages in addition to the primary advantage of alleviating the load conditions of the live roller circle. Additionally, it provides the advantage of permitting the machine to be maintained in service even when the live roller circle is failing which is not always possible under normal conditions. It also has the advantage of possibly permitting smaller roller circles for a given load condition thereby reducing the cost of manufacture of such machines. In addition, the use of a pressurized construction will reduce the load imposed on the grid structure of the lower frame or tub and particularly the rib or ribs supporting the lower rail pad, thus alleviating the problem of the separation of welded joints between the grid structure and the upper plate of the machine and particularly between the lower rail pads and the ribs supporting such pads.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. In an excavating machine having a lower frame, an upper frame and means for rotatably supporting said upper frame on said lower frame, an assembly for improving the loading condition of the upper frame supporting means comprising a first annular seal mounted on one of said upper and lower frames and disposed in wiping, sealing contact with the other of said upper and lower frames, a second annular seal mounted on one of said upper and lower frame and disposed in wiping, sealing contact with the other of said upper and lower frames, forming a sealed, annular chamber between said upper and lower and lower frames, and means for supplying air under pressure to said annular chamber to provide an upwardly directed force on said upper frame alleviating the load imposed on said upper frame supporting means.

2. An assembly according to claim 1 wherein said first annular seal is disposed exteriorly relative to said upper frame supporting means.

3. An assembly according to claim 1 wherein said second annular seal is disposed interiorly relative to said upper frame supporting means.

4. An assembly according to claim 3 including a center journal mounted on said lower frame, and wherein said upper frame is rotatably mounted on said center journal and said second annular seal is disposed about said center journal.

5. An assembly according to claim 3 wherein said second annular seal is disposed adjacent said upper frame supporting means.

6. An assembly according to claim 3 including a plurality of ring gear segments mounted on said lower frame, and wherein said second annular seal is mounted on said ring gear segments.

7. An assembly according to claim 1 wherein said first annular seal is disposed exteriorly relative to said upper frame supporting means and said second annular seal is disposed interiorly relative to said upper frame supporting means.

8. An assembly according to claim 7 wherein the pressure of the air supplied to said annular chamber is in the range of 5 psi to 15 psi.

9. An assembly according to claim 7 wherein said first annular seal comprises a plurality of brackets mounted on said lower frame, and a flexible sealing member mounted on said bracket segments and disposed in wiping contact with said upper frame.

10. An assembly according to claim 9 wherein the pressure of the air supplied to said annular chamber is in the range of 5 psi to 15 psi.

11. An assembly according to claim 9 wherein said sealing member consists of a leather material.

12. An assembly according to claim 9 wherein said flexible sealing member consists of a polyurethane material.

13. An assembly according to claim 9 including an annular pad mounted on said upper frame on which said upper rail is mounted, and wherein said flexible sealing member is disposed in wiping contact with said annular pad.

14. An assembly according to claim 9 wherein said flexible sealing element consists of a rubber and Teflon laminate.

15. In an excavating machine having a lower frame, an upper frame and means for rotatably supporting said upper frame on said lower frame, an assembly for improving the loading conditions of the upper frame supporting means comprising an annular seal comprising a plurality of bracket segments mounted on said lower frame and a flexible sealing element mounted on said bracket segments and disposed in wiping, sealing contact with said upper frame forming a sealed chamber between said upper and lower frames, and means for supplying air under pressure to said chamber to provide the upwardly directed force on said upper frame alleviating the load imposed on said upper frame supporting means.

16. An assembly according to claim 15 wherein the pressure of the air supply to said chamber is in the range of 5 psi to 15 psi.

17. An assembly according to claim 15 wherein said flexible sealing elements consists of a leather material.

18. An assembly according to claim 15 wherein said flexible sealing element consists of a polyurethane material.

19. An assembly according to claim 15 wherein said upper frame includes a pad on which said upper rail is mounted, and said flexible sealing element is disposed in wiping contact with said pad.

20. An assemby according to claim 15 wherein said annular seal is mounted exteriorly of said means for rotatably supporting said upper frame on said lower frame.

* * * * *